Figure 1:
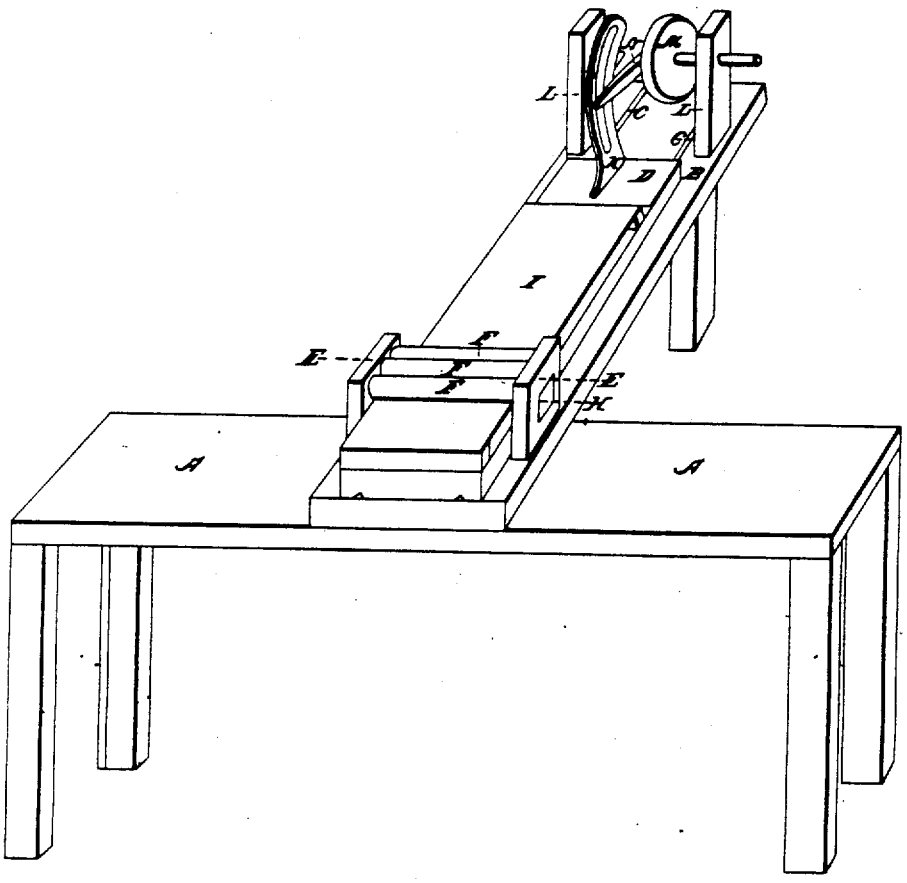
Figure 2:
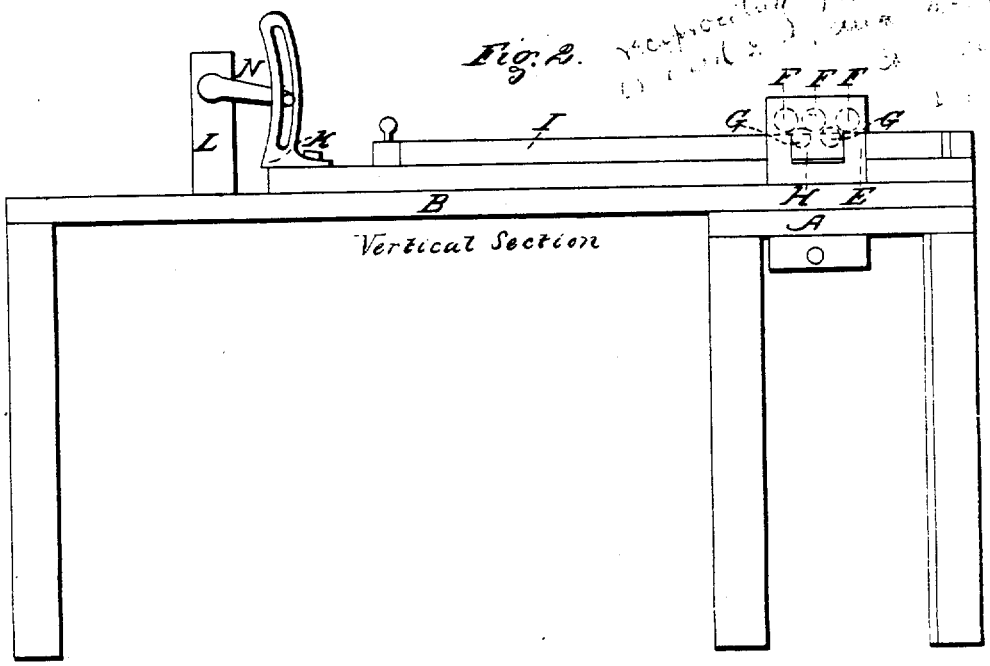

I. Fisher Jr. Sheet 1, 2 Sheets.

Coating Paper.

No. 8246X Patented Jun. 14, 1834.

BEST AVAILABLE COPY

BEST AVAILABLE COPY

I. Fisher Jr. Sheet 2, 2 Sheets.

Coating Paper.

8,246 Patented Jun. 14, 1834.

Vertical Section

N. PETERS, PHOTO-LITHOGRAPHER, WASHINGTON, D. C.

8346X June 14. 1834 8346X

Isaac Fisher Junr of Springfield Vermont

Letters Patent

The Schedule referred to in these Letters Patent and making part of the same containing a description in the words of the said Isaac Fisher Junr himself of his improvement in the process of softening sand or glass paper after the powder or grains have been applied thereto.

To all to whom these presents shall come; Be it known that I Isaac Fisher Jun. of Springfield in the County of Windsor and State of Vermont, have invented a new and useful improvement in the use of a machine for the purpose of softening glass or sand paper, after the size, and powder or grains have been applied thereto, and the following is a full and exact description of the said improvement as invented by me. On a bench about 4 feet and 8 inches long, by two feet wide, of convenient height, a bed piece of wood: 3 feet and 4 inches long by 16 inches wide, is placed transversely and secured to the same, by screws or otherwise, one end of which is even with the front side of the bench, and the other end extending beyond it is supported by a post or leg. on this bed piece are placed lengthwise of the same two iron rails 3½ feet long, by one inch thick, the upper part of said rails terminating in an edge. On these rails are made to slide a carriage about 28 inches long and 14 inches wide, which may be made of hard wood 4½ inches thick, On each side of the carriage and about 13½ inches from the front. is a stand passing through the bed piece and bench, and the lower ends confined to a girt, which is fastened to the under side of said Bench, by means of a rod which passes through the girt and both stands. these stands extend above the bed piece, about 8 inches, and are 5 inches wide by 1¼ inch thick, and may be made of hard wood or metal. Near the top of the stand, with three horizontal steel rollers placed parallel to each other, and about 1¼ inch in diameter, beneath these rollers are two other steel rollers of about two thirds the

[illegible] 8246x June 14, 1834 diameter of those above. the pivots of which run in vertical slides. which are placed in . said stands, between the pivots of the upper rollers by means of which slides, the smaller rollers may be raised or depressed as the thickness of the paper to be softened may require. A cloth apron is stretched between these two sets of rollers lengthwise of the carriage, one end of which is confined by nails to a ledge which is made fast to the upper side of the carriage, at the front end thereof, and raised about one inch and at the other end, to a bar moveable on the carriage, and fastened to the same by means of screws. This apron is about 21 inches long by 13 inches wide, near the rear end of the carriage, and upon it, and equidistant from its sides, is confined by screws, a cam which may be made of iron or brass, and fashioned into the shape of two bars, bent parallel to each other so as to describe about one third of a circle, and uniting at each extremity, with a space between said bars, sufficiently wide for a driving friction pulley of 1 3/8 inches diameter, to work in. The position of this cam is perpendicular to its base, having its convex side next to the front side of the machine. To the back side of said bench are confined two posts, rising about 16 inches above the same, and about 11 inches apart, in the top of these posts, run the main arbor. upon which and between said posts is mounted a driving pulley of about 12 inches diameter. this arbor in the end towards the cam has a crank fixed to it, at the extremity of which crank, which is about 7 inches from the centre of the main arbor is a pin upon which turns the friction pulley that works between the bars of the cam. The operation is performed as follows.

A single sheet of paper to be softened is placed upon the apron. with the sand side up, the power is then applied to the driving pulley, upon the main arbor. and the carriage set in motion by means of a crank One revolution of which carries the paper through between the rollers and back again, and allows the carriage, in consequence of the curve in the cam, to rest one third part of the time, 8846x June 14, 1834 547 during the time of which rest, the person tending the machine takes off the sheet of paper and places another upon the apron before the carriage is made to move again. By which operation a sheet of paper is softened at each revolution of the main arbor, laid aside and another sheet placed upon the apron. The cam may be so formed as to represent a semi circle which would require, that the stands should be placed about three inches farther back. A cam thus constructed would allow the carriage to be at rest one half of the time, while the main arbor is revolving, and consequently allow more time for the tender to take the sheet of softened paper from the apron, and replace it with another. Animal, water, or steam power may be used to impel the machine. The said machine and its several parts may be made of the above dimensions, or of any convenient proportional size. according to the extent of the business carried on. and of the Building in which it is placed.

The said Fisher does not claim the Invention of the above Machine or its several parts. but does claim the Invention of the use and application of the same for the purpose of softing glass or sand paper, in the manner above stated and set forth. (Ex.

Witnesses
Saml. W. Porter
Frederick A. Porter.

Isaac Fisher Junr

Drawing (1049 Words)

(Granted June 14. 1834)